(12) United States Patent
Kondor et al.

(10) Patent No.: US 10,408,293 B2
(45) Date of Patent: Sep. 10, 2019

(54) RUBBER BEARING AND METHOD FOR THE MANUFACTURE OF RUBBER BEARING

(71) Applicant: SumiRiko AVS Germany GmbH, Steinau an der Straße (DE)

(72) Inventors: Jozsef Kondor, Künzell (DE); Bulut Ciftci, Steinau an der Straße (DE); Balazs Mèszàros, Bad Soden Salmünster (DE)

(73) Assignee: SumiRiko AVS Germany GmbH, Steinau an der Strasse (DE)

( * ) Notice: Subject to any disclaimer, the term of this patent is extended or adjusted under 35 U.S.C. 154(b) by 51 days.

(21) Appl. No.: 15/788,507

(22) Filed: Oct. 19, 2017

(65) Prior Publication Data

US 2018/0112733 A1 Apr. 26, 2018

(30) Foreign Application Priority Data

Oct. 20, 2016 (DE) .......................... 10 2016 012 538

(51) Int. Cl.
*F16F 1/38* (2006.01)
*B60G 7/02* (2006.01)

(52) U.S. Cl.
CPC .............. *F16F 1/3828* (2013.01); *B60G 7/02* (2013.01); *F16F 1/3814* (2013.01); *B60G 2204/143* (2013.01); *B60G 2204/41* (2013.01)

(58) Field of Classification Search
CPC .......... F16F 1/38; F16F 1/3828; F16F 1/3814; F16C 27/06; B60G 7/02; B60G 2204/143; B60G 2204/41
See application file for complete search history.

(56) References Cited

U.S. PATENT DOCUMENTS

| 2008/0079205 A1* | 4/2008 | Hayashi | F16F 1/3828 267/140.13 |
| 2010/0327501 A1* | 12/2010 | Neureder | B60G 13/003 267/141 |
| 2012/0326368 A1* | 12/2012 | Makino | B60G 7/001 267/141.3 |

FOREIGN PATENT DOCUMENTS

| DE | 102004019917 A1 | 4/2004 | |
| JP | 5663067 B1 * | 2/2015 | ............. B60G 7/006 |

* cited by examiner

*Primary Examiner* — Melanie Torres Williams
(74) *Attorney, Agent, or Firm* — Armstrong Teasdale LLP

(57) ABSTRACT

The present disclosure provides a rubber bearing for connecting a vehicle component, in particular an axle tie rod to a vehicle chassis. The rubber bearing includes an inside part, an outside part, and an elastomer arranged between the inside part and the outside part and connecting the inside part and the outside part. The rubber bearing also includes a releasable axial stop limiting axial displacement of the inside part and of the outside part in a mounting position, wherein the releasable axial stop, in the mounting position, is at least one of in catch engagement with the inside part and clamped with the inside part.

11 Claims, 4 Drawing Sheets

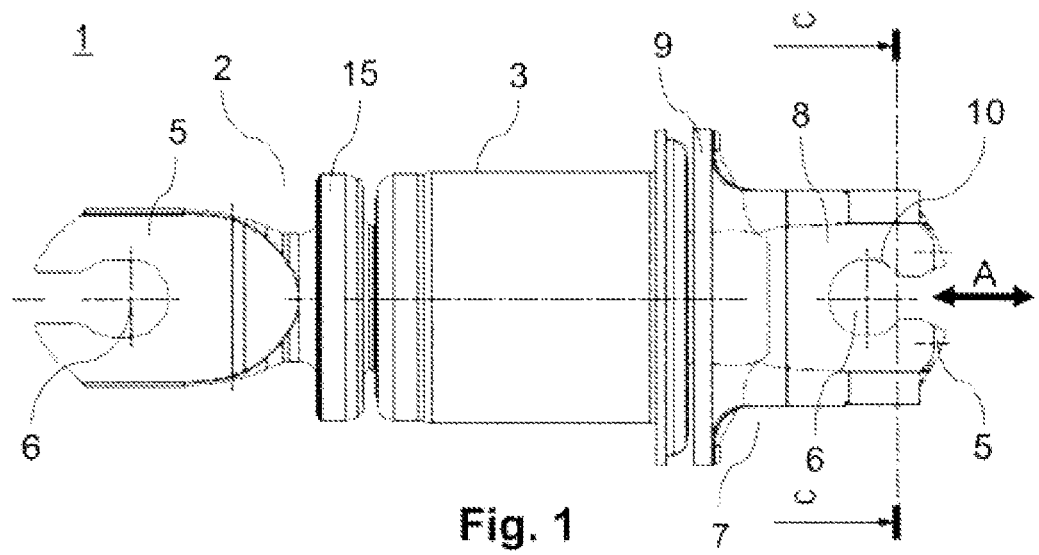
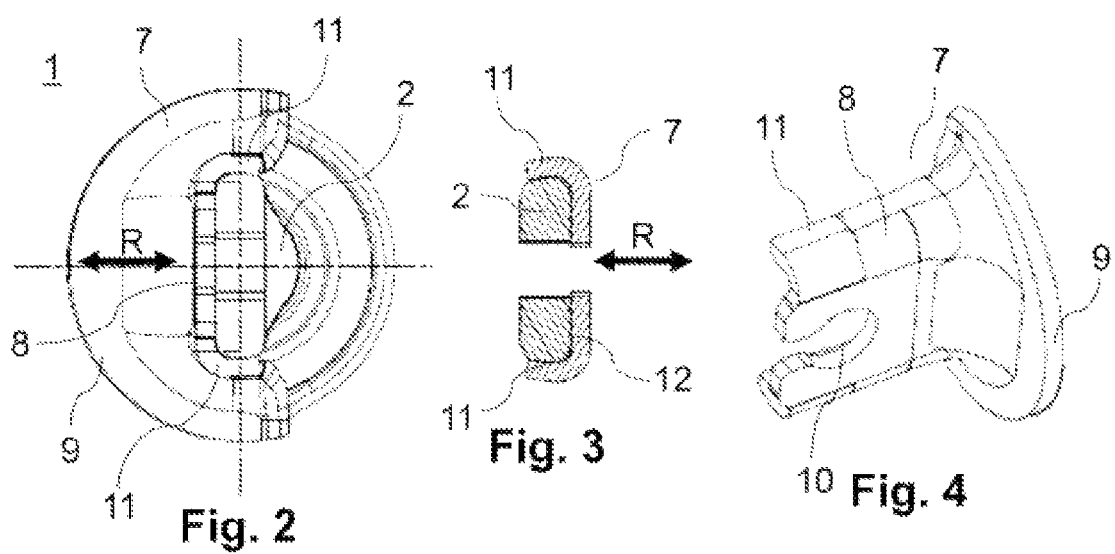

RUBBER BEARING AND METHOD FOR THE MANUFACTURE OF RUBBER BEARING

CROSS REFERENCE TO RELATED APPLICATIONS

This application claims the benefit of German Patent Application No. 102016012538.1 filed Oct. 20, 2016, which is hereby incorporated by reference in its entirety.

The present disclosure relates to a rubber bearing for connecting a vehicle component, in particular an axle tie rod, to a vehicle chassis, as well as a method for producing such a rubber bearing.

BACKGROUND

Rubber bearings are used in vehicles, for example, to connect vehicle components to the vehicle chassis, where vibrations are typically to be transferred from the vehicle components to the vehicle chassis, while at the same time, a certain mobility of the vehicle components relative to the vehicle chassis should be possible.

To limit mobility of the vehicle components relative to the vehicle chassis in the axial direction of the rubber bearing, axial stops may be provided in the rubber bearing. Axial stops fixedly connected to the rubber bearing allow simple mounting of the rubber bearing on the vehicle but are more complicated to manufacture and offer less design freedom in the rubber bearing. On the other hand, loose axial stops attached to the rubber bearing after production of the rubber bearing and during mounting of the rubber bearing on the vehicle are complicated to handle and mount.

The present disclosure therefore provides a rubber bearing with axial stops and a method for mounting the rubber bearing with a high design freedom.

BRIEF DESCRIPTION

The present disclosure provides a rubber bearing for connecting a vehicle component, in particular an axle tie rod, to a vehicle chassis. The rubber bearing includes an inside part, an outside part, an elastomer body arranged between the inside part and the outside part and connecting them, a releasable axial stop, limiting axial displacement of the inside part and the outside part relative to one another in a mounting position, wherein the releasable axial stop has a catch engagement with the inside part in the mounting position and/or is clamped to the inside part.

The rubber bearing advantageously permits simple mounting of the rubber bearing by the releasable axial stop, which can be engaged with and/or clamped on the inside part in the mounting position, because positioning of the axial stop by hand is not necessary. High demands are made of the accuracy in positioning the axial stop relative to the inside part because the play in movement of the outside part relative to the inside part is defined by the axial stop. Furthermore, the stopping face of the outside part and/or of the elastomer body on the axial stop is defined by the positioning of the axial stop. A precise positioning of the axial stop is ensured by catch engagement and/or clamping. The releasable axial stop also advantageously permits a high design freedom of the rubber bearing because the size and configuration of the axial stop can be adjusted independently of the size and configuration of the outside part, in particular with regard to the connectability of the outside part to a vehicle component.

The inside part and the outside part define an axial direction. For example, the inside part may have a fastening section on its axial ends for fastening the inside part and/or the rubber bearing on a vehicle chassis. The inside part may be fastened to the vehicle chassis by means of fastening screws in the fastening sections. The inside part may have an essentially cylindrical intermediate section between the fastening sections. The inside part may be designed to be essentially flat in the fastening sections and in particular may have two opposing fastening faces extending in parallel in the axial direction. The inside part may have transitional sections between the fastening sections and the intermediate section where the cross-sectional shape makes a gradual transition. The inside part may be manufactured of solid material. The material of the inside part may be metal or plastic, such as steel or aluminum.

The outside part may be designed to be sleeve-shaped and/or essentially a hollow cylinder and designed to radially surround the intermediate section of the inside part. The material of the outside part may also be metal or plastic, such as steel or aluminum. The outside part may be connected to a vehicle component such as an axle tie rod. For connection, the outside part may be pressed into an essentially cylindrical mounting recess on the axle tie rod. In particular, the axle tie rod may be a front lower steering arm. The outside part may also be formed by the exterior peripheral surface of the elastomer body, wherein the elastomer body can then be pressed directly into the mounting recess on the axle tie rod. In other words, the outside part represents the section of the rubber bearing that is connected to the vehicle component, such as the axle tie rod. The rubber bearing may also be referred to as a guide bearing or as a multidirectionally active guide bushing.

The elastomer body is arranged between the inside part and the outside part and connects them resiliently to one another, wherein a relative mobility of the outside part relative to the inside part is allowed in the axial direction in particular due to the elastic deformation of the elastomer body. The elastomer body is fixedly connected to the inside part as well as to the outside part.

The mounting position of the releasable axial stop is a predetermined or predeterminable position of the axial stop, which is assumed by the releasable axial stop relative to the inside part in correct mounting of the rubber bearing in order to limit any possible axial displacement of the inside part and the outside part relative to one another. The axial displaceability may therefore be adapted to the requirements of the rubber bearing and/or those of the vehicle. In other words, the mounting position of the releasable axial stop is a position which the releasable axial stop has in a mounting position of the rubber bearing. In particular, the releasable axial stop may be a single component, which is designed to be separate from the inside part, the outside part, and the elastomer body. The releasable axial stop may be made of metal or plastic, such as steel or aluminum. The releasable axial stop may have a contact section and a stop section. The contact section may be in contact with at least one surface of the inside part in the mounting position. The contact section may be in flat contact with a fastening surface of one of the fastening sections of the inside part when in the mounting position in particular. The stop section may extend essentially at a right angle to the contact section essentially in a radial direction in the mounting position.

In the mounting position, the releasable axial stop can be engaged and/or clamped with or to the inside part and/or has a catch engagement and/or clamping effect therewith. For catch engagement, the releasable axial stop may have a catch engagement section, wherein the releasable axial stop may be brought by the inside part into the mounting position by overcoming an elastic deformation of the catch engagement section, wherein the catch engagement section then forms a catch engagement undercut to the inside part in the mounting position. For clamping, the releasable axial stop may have a clamping section, wherein the releasable axial stop may be brought into the mounting position by the inside part with elastic deformation of the clamping section, wherein the clamping section forms a force-locking connection with the inside part because of frictional forces when in the mounting position. The catch engagement undercut and/or the force-locking connection of the clamping section may act in the radial and/or axial direction and in combination with other sections of the releasable axial stop, such as the contact section and/or the guide sections, for example, and then may position and secure the releasable axial stop on the inside part in the mounting position. The catch engagement has a form-fitting action but at the same time may also have a force-locking component. A catch engagement may also be referred to as a snap connection or a clip connection. For the final load-bearing fixation, the releasable axial stop may be fastened by means of a fixation element such as, for example, a fastening screw of the inside part.

The catch engagement and/or the clamping may be configured in such a way that manual release of the releasable axial stop by manual force may not be possible, i.e., it may only be released by means of a tool. The releasable axial stop may be configured so that it may be engaged and/or clamped with the inside part manually, i.e., without a tool. However, the releasable axial stop may also be configured, so that it may be engaged and/or clamped with the inside part only by means of a tool.

The releasable axial stop is engageable and/or clampable with the inside part in an axial direction of the inside part and/or in a radial direction of the inside part.

The possibility of bringing the releasable axial stop into the mounting position in an axial direction of the inside part and/or in a radial direction of the inside part and engaging and/or clamping it with the inside part simplifies mounting of the rubber bearing.

For example, the releasable axial stop may be pushed in the axial direction onto the inside part, in particular the fastening section thereof, wherein the releasable axial stop may be guided by lateral guide sections and wherein the axial section of the releasable axial stop may slide on the fastening surface of the inside part. The catch engagement section(s) of the releasable axial stop may be designed on the guide sections in such a way that they form an axial catch engagement undercut in the mounting position after they have been elastically deformed by the outside surface of the fastening section of the inside part and have then been elastically restored. However, the releasable axial stop may also be configured so that it can be clipped onto the inside part in a radial direction, such as at a right angle to the fastening surface of the inside part. The catch engagement section may be a catch engagement arm, catch engagement protrusion or catch engagement hook, catch engagement rail, or the like, which extends essentially at a right angle to the stop section and forms in the mounting position a radial catch engagement undercut after the latter has undergone elastic deformation due to the outside surface of the fastening section of the inside part and then has been elastically restored. The clamping section(s) of the releasable axial stop may be designed so that they are elastically deformed by the outside surface of the fastening section of the inside part in the mounting position and therefore clamp and/or secure the inside part. The clamping section may be a clamping arm, a clamping protrusion, clamping rail, or the like. The clamping section extends essentially at a right angle to the contact section and forms a force-locking connection to the inside part in the mounting position due to the clamping forces after it has undergone elastic deformation due to the outside surface of the fastening section of the inside part. The catch engagement section and the clamping section may be formed integrally, i.e., in one piece.

The releasable axial stop may be formed so that it may be brought into the mounting position optionally in an axial direction as well as in a radial direction in order to engage with and/or be clamped to the inside part. For example, a catch engagement section, which forms an axial catch engagement undercut as well as a radial catch engagement undercut to the inside part, may be provided in the mounting position. However, a plurality of catch engagement sections may also be provided, wherein a catch engagement section, for example, forms an axial catch engagement undercut and another catch engagement section forms a radial catch engagement undercut. It is also possible to combine catch engagement sections and clamping sections with one another.

For example, the releasable axial stop has a fixation recess by means of which a fastening screw of the inside part may be passed through the axial stop in order to secure the releasable axial stop on the inside part.

The releasable axial stop may be secured in the mounted position by the fastening screw on the inside part in a load-bearing connection. The inside part may also be fastened onto the vehicle chassis with the fastening screw in order to mount the rubber bearing. The fixation recess is arranged and/or formed in particular in the contact section of the releasable axial stop. The fixation recess extends through the releasable axial stop, wherein the fixation recess may be closed at the side or it may open, for example, in the axial direction of the inside part. The contour of the fixation recess of the releasable axial stop may correspond essentially to a contour of a fastening recess on the inside part, wherein the fixation recess and the fastening recess may be aligned essentially with one another in the mounting position so that the fastening screw can be passed through both recesses and tightened onto the vehicle chassis. When tightening the screw(s) the releasable axial stop and the inside part are then clamped securely between the screw head and the vehicle chassis.

The releasable axial stop has a semicircular stop section.

The semicircular stop section extends radially outward away from the inside part in the mounting position. Therefore, the releasable axial stop may easily be engaged and/or clamped with the inside part in a radial direction without resulting in contact between the stop section and the inside part. The releasable axial stop may, however, also have a stop section in the form of a full circle in order to enlarge the stop area. In the case of a full circle stop section, the releasable axial stop may be pushed onto the inside part in the axial direction and engaged and/or clamped thereon.

The elastomer body protrudes in the axial direction away from the outside part in such a way that with an axial displacement of the inside part and the outside part relative to one another, an axial end face of the elastomer body comes in contact with the releasable axial stop.

Because the axial end face of the elastomer body facing the releasable axial stop comes to a stop against the releasable axial stop when there is a relative displacement, it is possible to easily reduce stop generated noises as well as increase the durability of the rubber bearing. The axial end of the outside part facing the releasable axial stop may have a peripheral apron section extending radially outward, supporting an outer edge region of the axial end face of the elastomer body in the axial direction. For example, the elastomer body may protrude approx. 1 mm to approx. 5 mm away from the outside part. Due to the protruding elastomer body, the vehicle component connected to the outside part, such as the axle tie rod, does not come in contact with the releasable axial stop.

The rubber bearing also has a fixed axial stop, which is fixedly connected to the inside part, wherein the outside part is arranged between the releasable axial stop and the fixed axial stop, and wherein a section of the elastomer body is vulcanized onto a stop face of the fixed axial stop.

The fixed axial stop may be integral with the inside part, i.e., designed in one piece in particular. The fixed axial stop may extend essentially in the radial direction away from the inside part and may be formed peripheral on the inside part. In the cross section transversely to the axial direction, the fixed axial stop may be essentially circular in shape. Due to the section of the elastomer body vulcanized onto the stop face of the fixed axial stop, the noise caused by the stop can be reduced easily and the lifetime of the rubber bearing can be increased. In production of the elastomer body, the elastomer body may be vulcanized onto the inside part, the outside part, and the stop face of the fixed axial stop in a single working step. The stop face of the fixed axial stop having the elastomer layer of the elastomer body thereon may come to a stop against a peripheral section of the outside part with a flange facing radially inward with an axial displacement of the inside part relative to the outside part. Alternatively or additionally, the stop face of the fixed axial stop having the elastomer layer of the elastomer body thereon may come to a stop against an end face of the elastomer body facing the fixed axial stop when there is axial displacement of the inside part relative to the outside part. To allow a relative axial displacement of the outside part relative to the fixed axial stop, the elastomer body may have a groove, such as a peripheral groove, which is arranged and/or formed between the vulcanized section on the stop face of the fixed axial stop and the outside part. Instead of the fixed axial stop, however, the rubber bearing may also have a second releasable axial stop, wherein then the end face of the elastomer body facing the second releasable axial stop may protrude axially away from the outside part.

On each axial end, the inside part has a fastening recess for connecting the inside part to the vehicle chassis, wherein the fastening recesses are open toward the outside axially.

The inside part may have a shape like that of a fork bowl. Due to the fastening recesses that are open toward the outside axially, the strength of the inside part can be reduced in a targeted manner in the area of the fastening sections so that the inside part can be deformed more easily under the crash load in the event of a crash and release the fastening screws. It is therefore possible, for example, to prevent a wheel that is fastened by means of the rubber bearing from slipping into the foot space of the passenger compartment during a crash because the inside part thereby released will slip away from the vehicle at the side. The fixation recess in the releasable axial stop is also open toward the outside axially, so that in the event of a crash the inside part is also released more easily from the corresponding fastening screw, even with a fixed releasable axial stop.

The outside part has at least one calibration section with a reduced diameter.

The elastomer body may advantageously be prestressed by the calibration section so that the lifetime of the elastomer body may be increased. Furthermore, the radial stiffness and, to a lesser extent, the axial stiffness of the rubber bearing may be altered or modified in a targeted manner through the calibration section in order to impart desired properties to the rubber bearing. The outside part may have several calibration sections which may be designed so they are spaced a distance apart from one another in the axial direction of the outside part and may also have different degrees of calibration. Calibration sections with different degrees of calibration may also be aligned like steps. The outside part is not calibrated in the sections outside of the calibration sections. In calibration, the circumference of the outside part is compressed in sections by means of a tool after material has been vulcanized onto the elastomer body, therefore reducing the diameter of the outside part.

The inside part has a bulging section with an enlarged diameter.

The radial and axial stiffness of the rubber bearing may advantageously be increased in a targeted manner without increasing the hardness of the rubber in order to impart desired properties to the rubber bearing. At the same time, the cardan stiffness may be reduced due to a bulging section.

The bulging section is formed centrally in the elastomer body and/or centrally in the inside part between the releasable axial stop and the fixed axial stop. In the bulging section the material of the inside part is shaped with a camber such that the diameter of the bulging section may be increased by approx. 10% to approx. 50% in comparison with the diameter of the essentially cylindrical intermediate section of the inside part.

The elastomer body is vulcanized onto the inside part and the outside part.

Alternatively, the elastomer body may also be glued to the inside part and/or the outside part and/or the axial stop. Alternatively, the elastomer body may be secured on the inside part and/or the outside part and/or the axial stop in a force-locking and/or form-fitting manner. Whenever vulcanizing onto something is mentioned in the present disclosure, adhesive bonding and/or a form-fitting connection and/or a first locking connection may also be used alternatively as the connection.

Vulcanization yields a particularly tight connection of the elastomer body to the inside part and to the outside part in one step in a particularly simple manner. For vulcanization, the inside part and the outside part may be placed in a mold and overmolded with the material of the elastomer body by injection molding. In adhesive bonding, one or more surfaces of the inside part and/or the outside part and/or the axial stop is/are provided with adhesive. In a force-locking and/or form-fitting connection, the elastomer body is secured in a known way between the inside part and the outside part and/or the axial stop.

The present disclosure provides a method for producing a rubber bearing for connecting a vehicle component, in particular an axle tie rod, to a vehicle chassis. The method includes (i) providing an inside part, (ii) providing an outside part, (iii) providing an elastomer body arranged between the inside part and the outside part and connecting them, and (iv) providing a releasable axial stop and a catch engagement and/or clamping of the releasable axial stop with the inside part in a mounting position, so that the releasable axial stop limits an axial displacement of the inside part and the outside part relative to one another.

BRIEF DESCRIPTION OF THE DRAWINGS

Embodiments of the disclosure are described in detail below on the basis of the accompanying figures. The present disclosure is not limited to these embodiments and individual features of the embodiments may be combined in any way to yield other embodiments.

FIG. 1 shows a top view of an example embodiment of a rubber bearing in a view from above;

FIG. 2 shows a front view of the rubber bearing shown in FIG. 1;

FIG. 3 shows a sectional diagram of the rubber bearing shown in FIG. 1 transversely to a axial direction along a sectional line C-C shown in FIG. 1;

FIG. 4 shows a perspective view of a releasable axial stop of the rubber bearing shown in FIG. 1;

FIGS. 1 to 5 relate to a rubber bearing 1 according to an example embodiment. The rubber bearing 1 has an inside part 2, an outside part 3 and an elastomer body 4, wherein the elastomer body 4 is vulcanized onto the inside part 2 and onto the outside part 3, and the two parts 2, 3 are joined to one another resiliently. The outside part 3 is designed in the form of a sleeve and has an essentially cylindrical outside surface. The outside part 3 is designed to be pressed into a mounting recess in an axle tie rod. The inside part 2 is designed to be elongated and has at the axial ends a fastening section 5 with a fastening recess 6 on each of its axial ends in order to be able to screw the inside part 2 to a vehicle chassis. The fastening recesses 6 are open axially at the sides, and the inside part 2 may be deformed easily under the crash load in the event of a crash and will release the fastening screws.

A releasable axial stop 7 arranged on the inside part 2 faces an axial end of the outside part 3. FIGS. 1 to 3 and 5 show the releasable axial stop 7 in the mounting position in which the releasable axial stop 7 is engaged with the inside part 2. FIG. 4 shows the releasable axial stop 7 as a single component in the released condition. The releasable axial stop 7 has a contact section 8 and a semicircular and/or half disk-shaped stop section 9 extending essentially at a right angle thereto. The contact section 8 is situated in the area of a fastening section 5 in the mounting position on the outside face of the inside part 2. The contact section 8 has a fixation recess 10, through which the fastening screw of the inside part can be passed in order to be secured on the inside part 2 and/or on the rubber bearing 1 by applying a load to the releasable axial stop 7 when the inside part 2 is screwed onto the vehicle chassis. As in the case of the fastening recess 6, the fixation recess 10 is also open at the side axially. In the mounting position, the releasable axial stop 7 is arranged relative to the inside part 2 in such a way that the fastening recess 6 and the fixation recess 10 are arranged essentially concentrically, so that the fastening screw can be passed through both recesses 6, 10.

Figure 5:
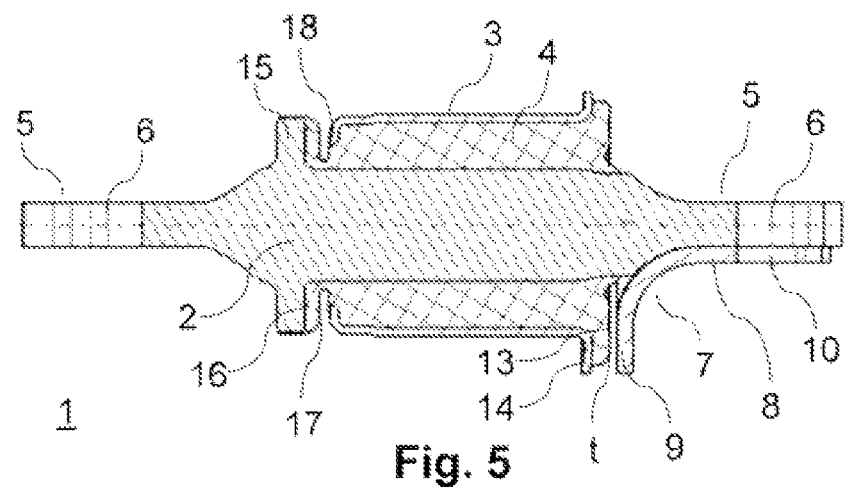
FIG. 5 shows an axial sectional diagram of the rubber bearing shown in FIG. 1.

The releasable axial stop 7 has an engagement section 11 to engage the releasable axial stop 7 with and/or on the inside part 2. The catch engagement section 11 has a pair of engagement arms which each extent essentially at a right angle on both sides of a contact face 12 of the contact section 8, wherein, however, the catch engagement arms are bent slightly more toward the inside, so that in the mounting position, they form a catch engagement undercut to the material of the inside part 2, which acts in a radial direction R at a right angle to the contact face 12. Due to the friction of the catch engagement arms on the side faces of the inside part 2, the releasable axial stop 7 is also secured and/or clamped in a force-locking manner in the axial direction A. The catch engagement section 11 has therefore the function of a clamping section. The releasable axial stop 7 can be brought into the mounting position relative to the inside part 2 in the radial direction R transversely to the contact face 12 and/or in the axial direction A into the mounting position and engaged there.

The axial end face 13 of the elastomer body 4 facing the stop section 9 protrudes axially with respect to the outside part 3 and comes to a stop against the stop section 9 in a relative axial displacement of the inside part 2 relative to the outside part 3. The gap t between the axial end face 13 and the stop section 9 defines the mobility of the outside part 3 relative to the inside part 2 in the direction of the releasable axial stop 7 and may be adjusted to meet specifications. The radial outside region of the axial end face 13 is supported in the axial direction by an apron section 14 of an axial end section of the outside part 3.

The inside part 2 also has a fixed axial stop 15, wherein the outside part 3 and the elastomer body 4 are arranged between the releasable axial stop 7 and the fixed axial stop 15. The elastomer body 4 is vulcanized onto one stop face 16 of the fixed axial stop 15, wherein the elastomer body 4 has a peripheral groove, which defines the mobility of the outside part 2 relative to the inside part 3 in the direction of the fixed axial stop 15. The configuration of the groove 17, in particular the width thereof, may be adjusted according to requirements. The axial end section of the outside part 3, which is opposite the apron section 14 and facing the fixed axial stop 15 has a flanged section 18 in which the outside part 3 is flanged toward the inside. The groove 17 is designed so that, when there is a displacement of the inside part 2 relative to the outside part 3, an axial end face of the flanged section 18 comes to a stop against the fixed axial stop 15 with the section of the elastomer body 4 vulcanized onto it.

Figure 6:
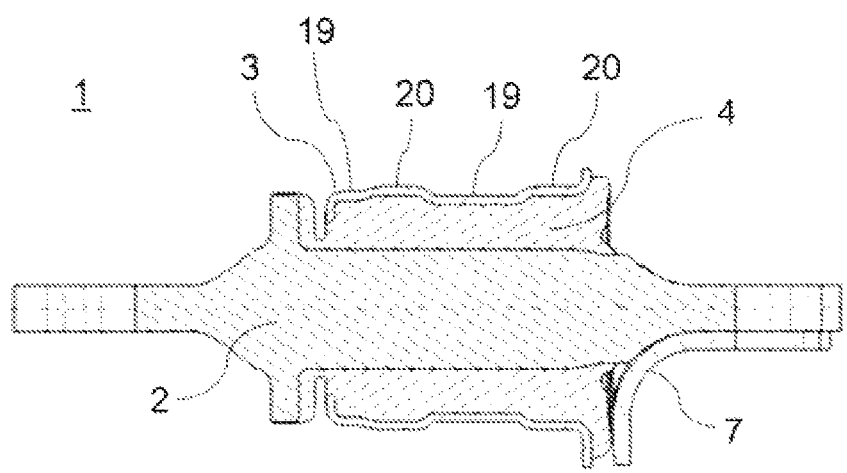
FIG. 6 shows an axial sectional diagram of a rubber bearing according to an alternative embodiment.

FIG. 6 shows an axial sectional diagram of a rubber bearing 1 according to an alternative embodiment, wherein the section runs in the axial direction along the longitudinal axis. The difference in this alternative embodiment in comparison with the example embodiment in FIG. 1 is that the outside part 3 has calibration sections 19 in which the outside diameter of the outside part 3 is reduced. The calibration sections 19 are formed in sections in the axial direction. The elastomer body 4 can be prestressed by means of calibration sections 19, and the radial and axial stiffness of the elastomer body 4 can be varied and/or modified in a targeted manner. The outside part 3 also has uncalibrated sections 20.

Figure 7:
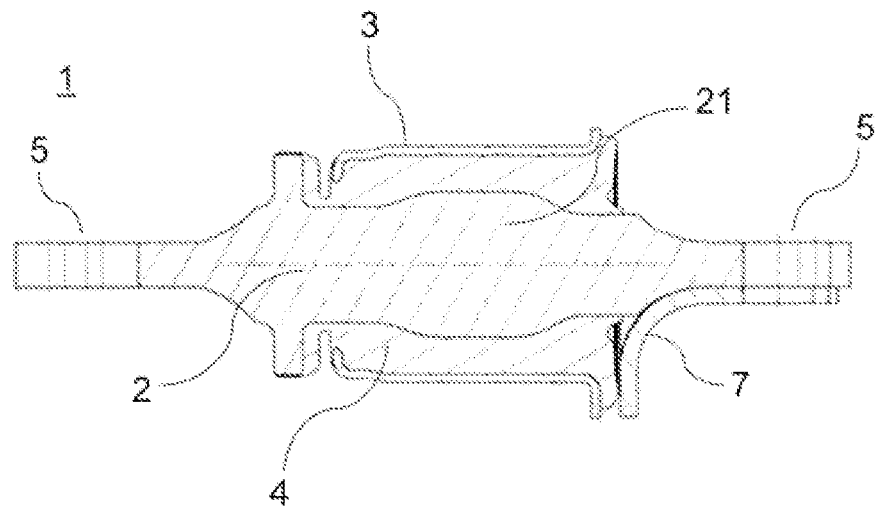
FIG. 7 shows an axial sectional diagram of a rubber bearing according to an alternative embodiment.

FIG. 7 shows an axial sectional diagram of a rubber bearing 1 according to an alternative embodiment. This alternative embodiment differs from the example embodiment in FIG. 1 in that the inside part 2 has a bulging section 21 in which the diameter of the inside part 2 is increased. The radial and axial stiffness of the rubber bearing may be increased in a targeted manner without increasing the hardness of the rubber, and the cardan stiffness may be reduced by means of the bulging section 21 in a targeted manner. The bulging section 21 is arranged approximately centrally in the elastomer body 4 in the axial direction and is surrounded by the outside part 3. In the bulging section 21, the material of the inside part 2 bulges outward radially. The bulging section 21 is formed centrally between the fastening sections 5 of the inside part 2.

Figure 8:
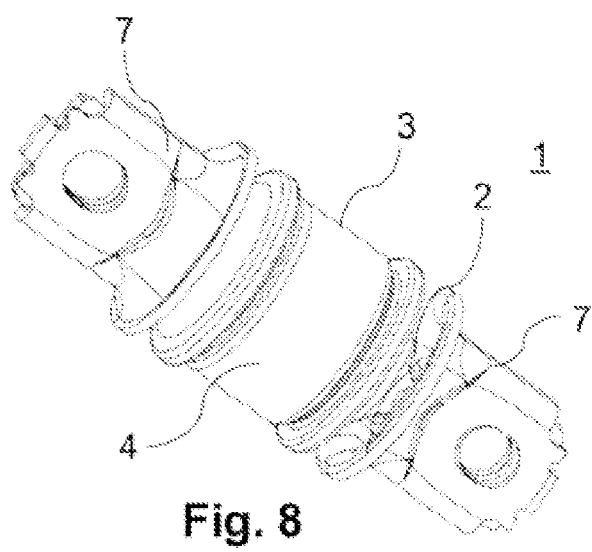
FIG. 8 shows a perspective view of a rubber bearing according to an alternative embodiment.
Figure 9:
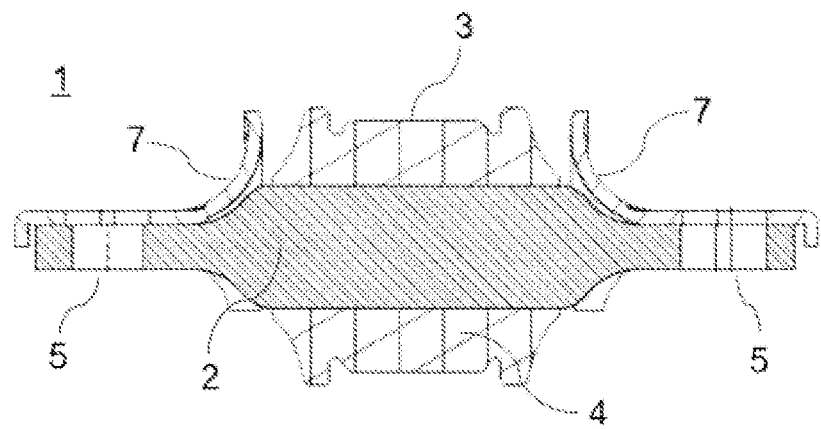
FIG. 9 shows an axial sectional diagram of a rubber bearing according to the alternative embodiment shown in FIG. 8.

FIG. 8 shows a perspective diagram of rubber bearing 1 according to an alternative embodiment and FIG. 9 shows an axial sectional diagram thereof. The difference in this alternative embodiment in comparison with the example embodiment in FIG. 1 is that the rubber bearing 1 has two releasable axial stops 7 each of which engages with the inside part 2 in the mounting position on the fastening sections 5 of the inside part 2. FIG. 8 shows a condition in which the right releasable axial stop 7 is not yet in the mounting position, i.e., is not yet engaged with the inside part 2. The rubber bearing 1 according to the alternative embodiment in FIG. 8 does not have a fixed axial stop. Another difference lies in the design of the outside part 3 which is formed on the radial outside surface of the elastomer body 4. Thus, the elastomer body 4 may be inserted directly into a mounting recess in a vehicle component such as an axle tie rod to connect the rubber bearing 1 to the vehicle component. Due to the bilaterally releasable axial stops 7 the outside part 3 may be connected to the vehicle component in a particularly simple manner.

Figure 10:
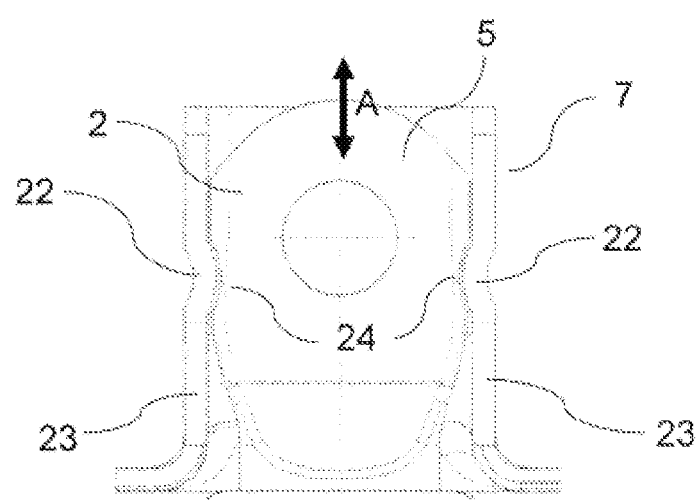
FIG. 10 shows a top view of a section of a rubber bearing according to an alternative embodiment.

FIG. 10 shows a top view of a section of a rubber bearing according to an alternative embodiment. The difference in this alternative embodiment in comparison with the example embodiment in FIG. 1 lies in the configuration of the catch engagement of the releasable axial stop 7 and the inside part 2. The contact section 8 of the releasable axial stop 7 according to this alternative embodiment has catch engagement protrusions 22, which protrude radially inward from lateral guide sections 23 of the releasable axial stop 7 in the width direction of the fastening section 5 of the inside part 2. The side faces of the fastening section 5 of the inside part 2 each have a suitably shaped catch engagement recess 24, in which the catch engagement protrusions 22 engage in the mounting position, thereby forming a catch engagement undercut in the axial direction A which secures and/or engages the releasable axial stop 7 at least in the axial direction. It should be pointed out that even an opposite arrangement of the catch engagement protrusion and the catch engagement recess is also possible, so that the fastening section 5 has catch engagement protrusions extending radially outward and the releasable axial stop 7 has corresponding catch engagement recesses. The releasable axial stop 7 and the inside part 2 may also have catch engagement protrusions and recesses which protrude and/or are set back in a direction perpendicular to the fastening surface of the fastening section 5 in order to create the catch engagement. Various catch engagement configurations can also be combined with one another and/or combined with clamping configurations.

LIST OF REFERENCE NUMERALS

1 Rubber bearing
2 Inside part
3 Outside part
4 Elastomer body
5 Fastening section
6 Fastening recess
7 Releasable axial stop
8 Contact section
9 Stop section
10 Fixation recess
11 Catch engagement section
12 Contact face
13 Axial end face of the elastomer body
14 Apron section
15 Fixed axial stop
16 Stop face
17 Groove
18 Flanged section
19 Calibration section
20 Uncalibrated section
21 Bulging section
22 Catch engagement protrusion
23 Lateral guide section
R Radial direction
A Axial direction
t Gap

What is claimed is:

1. A rubber bearing for connecting a vehicle component to a vehicle chassis, comprising:
   an inside part;
   an outside part;
   an elastomer body arranged between the inside part and the outside part and connecting the inside part and the outside part; and
   a releasable axial stop limiting axial displacement of the inside part and of the outside part in a mounting position,
   wherein the releasable axial stop, in the mounting position, is fastened to the inside part in at least one of a releasable catch engagement and a releasable clamped engagement.

2. The rubber bearing according to claim 1, wherein the releasable axial stop is fastened to the inside part in at least one of an axial direction of the inside part and a radial direction of the inside part.

3. The rubber bearing according to claim 1, wherein the releasable axial stop includes a fixation recess through which one fastening screw of the inside part is passed to secure the releasable axial stop on the inside part.

4. The rubber bearing according to claim 1, wherein the releasable axial stop includes a semicircular stop section.

5. The rubber bearing according to claim 2, wherein the elastomer body protrudes in the axial direction away from the outside part in such a way that with an axial displacement of the inside part and the outside part relative to one another, one axial end face of the elastomer body comes to a stop against the releasable axial stop.

6. The rubber bearing according to claim 1 further comprising a fixed axial stop fixedly connected to the inside part, the outside part being arranged between the releasable axial stop and the fixed axial stop, and a section of the elastomer body being at least one of glued and vulcanized onto a stop face of the fixed axial stop.

7. The rubber bearing according to claim 1, wherein the inside part includes fastening recesses on its axial ends for connecting the inside part to the vehicle chassis, and
   wherein the fastening recesses are open axially to the outside.

8. The rubber bearing according to claim 1, wherein the outside part includes at least one calibration section with a reduced diameter.

9. The rubber bearing according to claim 1, wherein the inside part includes a bulging section with an enlarged diameter.

10. The rubber bearing according to claim 1, wherein the elastomer body is at least one of i) glued or vulcanized onto the inside part and onto the outside part, and ii) connected thereto in a force-locking and/or form-fitting manner.

11. A method for producing a rubber bearing for connecting a vehicle component to a vehicle chassis, the method comprising:
  providing an inside part;
  providing an outside part;
  providing an elastomer body arranged between the inside part and the outside part, and connects the inside part and the outside part;
  providing a releasable axial stop; and
  fastening, in a mounting position, the releasable axial stop to the inside part in at least one of a releasable catch engagement and a releasable clamped engagement, wherein the releasable axial stop limits axial displacement of the inside part and of the outside part relative to one another.

* * * * *